United States Patent
Liensberger et al.

(10) Patent No.: US 9,262,183 B2
(45) Date of Patent: Feb. 16, 2016

(54) SELF-SERVICE COMPOSED WEB APIS

(75) Inventors: Christian Liensberger, Bellevue, WA (US); Roger Mall, Sammamish, WA (US); Piotr Milosz Puszkiewicz, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 176 days.

(21) Appl. No.: 13/453,772

(22) Filed: Apr. 23, 2012

(65) Prior Publication Data

US 2013/0282748 A1    Oct. 24, 2013

(51) Int. Cl.
  *G06F 17/00* (2006.01)
  *G06F 17/30* (2006.01)
  *G06F 9/445* (2006.01)

(52) U.S. Cl.
  CPC .................. *G06F 9/44526* (2013.01)

(58) Field of Classification Search
  CPC ....... G06F 8/34; G06F 8/33; G06F 17/30103; G06F 17/30112; G06F 17/30389
  See application file for complete search history.

(56) References Cited

U.S. PATENT DOCUMENTS

| | | | |
|---|---|---|---|
| 7,761,885 B2 | 7/2010 | Labrou et al. | |
| 8,024,399 B2 * | 9/2011 | Reisman | 709/203 |
| 2005/0289047 A1 * | 12/2005 | Oliver et al. | 705/39 |
| 2008/0209451 A1 * | 8/2008 | Michels et al. | 719/328 |
| 2009/0037391 A1 * | 2/2009 | Agrawal et al. | 707/3 |
| 2009/0125796 A1 * | 5/2009 | Day et al. | 715/219 |
| 2011/0029949 A1 | 2/2011 | Adams et al. | |
| 2011/0202932 A1 | 8/2011 | Borghini et al. | |
| 2011/0225195 A1 | 9/2011 | Kubicki et al. | |

OTHER PUBLICATIONS

Pastore, Serena, "Feeds and Mashups: Towards New Web Applications Paradigms and Development for Information Distribution," IADIS International Conference WWW/Internet 2008, Oct. 13, 2008, pp. 409-413, (downloaded from: http://www.iadis.net/dl/final_uploads/200817C058.pdf).

Mason, Ross, "How REST replaced SOAP on the Web: What it means to you," InfoQ, Oct. 20, 2011, (17 pages), (downloaded from: http://www.infoq.com/articles/rest-soap on Mar. 14, 2012).

(Continued)

*Primary Examiner* — Cheryl Lewis
(74) *Attorney, Agent, or Firm* — Nicholas Chen; Kate Drakos; Micky Minhas

(57) ABSTRACT

Individual datasets are accessed using an application programming interface (API). Multiple APIs may be combined into a composite API that allows a user to access multiple datasets using a single query. The composite API may be designed to provide a simpler way to consume information from multiple datasets in response to a particular scenario or problem. The composite API may comprise multiple levels of intermediate APIs that call on each other to access desired datasets. A user may select the datasets that the composite API accesses and/or the composite API may require certain specific datasets. The composite API may be offered for sale or use by other users via a website, such as a data market.

28 Claims, 5 Drawing Sheets

(56) References Cited

OTHER PUBLICATIONS

MSDN, "Chapter 26: Designing Hosted and Cloud Services," Oct. 19, 2009, (17 pages), (downloaded from: http://msdn.microsoft.com/en-us/library/ee658110.aspx on Mar. 14, 2012).

Carraro, Gianpaolo, et al., "Software as a Service (SaaS): An Enterprise Perspective," Sep. 5, 2008, (15 pages), (downloaded from: http://msdn.microsoft.com/en-us/library/aa905332.aspx on Mar. 14, 2012).

* cited by examiner

SELF-SERVICE COMPOSED WEB APIS

BACKGROUND

An application programming interface (API) is a specification intended to be used as an interface by software components to communicate with each other. Currently it is very difficult to sell and distribute APIs on the Internet or on any other networks. An API creator has to develop the backend, such as create and populate a database and implement function calls to other APIs, in order to expose the API. Furthermore, if the API creator wants to sell the API, then the API has to be integrated with complicated distribution and billing systems that typically require expert knowledge to use.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The API development system disclosed herein enables both casual API creators, such as information workers and entry-level developers, and professional software developers to take existing APIs that are exposed on the Internet or on any other network and compose them through a composition user interface. These composed APIs can then be exposed as a new API and shared with others. Furthermore, with one click the new API can be commercial enabled and sold through an online platform, such as cloud computing marketplace or any other commercial application.

The API development solution may also automatically suggest to the user which APIs can be combined so that the APIs can be exposed in a meaningful way. The APIs that are suggested to other users are identified using semantics, by analyzing other people's usage of the APIs, and by analyzing other APIs in the same domain and how they are composed.

The API creation system also provides basic transforms and is extensible to add more complicated transforms to the user. This allows the user to compose powerful APIs and to expose them for use by others. Additionally, the solution does not limit the user to composing only APIs. Instead, the system is flexible enough to allow users to compose APIs, data stores, calls to crawl websites, etc. and to expose them all as one API.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Large amounts of data are continuously collected and stored as datasets by independent data managers. These datasets may be available to users either on a free or subscription basis. Many of these datasets are stored in specific formats or must be accessed by a specific applications or APIs, which makes access and integration difficult for potential users. The data managers often collect and organize the datasets for a particular purpose, such as a proprietary application or business use. However, each dataset—either on its own or in combination with other datasets—may also be useful to other users for different applications. The data manager may not have the motivation to create additional applications that use the dataset and/or may not have knowledge of other users' needs. Instead, the data manager may just be a subject matter expert for the dataset. Similarly, other users may have specific problems to solve using the dataset, but may not have the skills required to create and manage the necessary data.

In one embodiment, users may create a composite API that provides an answer to a specific question or that combines two or more datasets in a manner that is useful in a way that is not intended by the dataset creators. As a result, the datasets are accessed more easily by other users. The composite API creator may then offer the API to other users for free or for a price, for example, via an API or dataset marketplace.

The datasets may be a data compilation stored in a database or a web service that returns a response based on input. Data compilations may include, for example, telephone and address verification and validation data, sports scores and statistics, current and historical financial, business and employment data, newspaper and magazine article databases, and geographic, mapping and atlas information. Web service datasets include, for example, language translation services or location-based weather forecast. The datasets may use a standardized protocol for querying data. By standardizing the queries, the data may be used without requiring a subscriber to learn or adopt a specialized interface for each dataset. The standardized queries may define, for example, messages for calling into the dataset, messages for reading or using the dataset response, standardized APIs, standardized data formats, and the like. In one embodiment, the datasets use the Open Data Protocol (OData), which exposes information from a variety of sources, such as relational databases, file systems, content management systems, and web sites, and allows a dataset subscriber to access to the dataset via HTTP messages.

Figure 1:
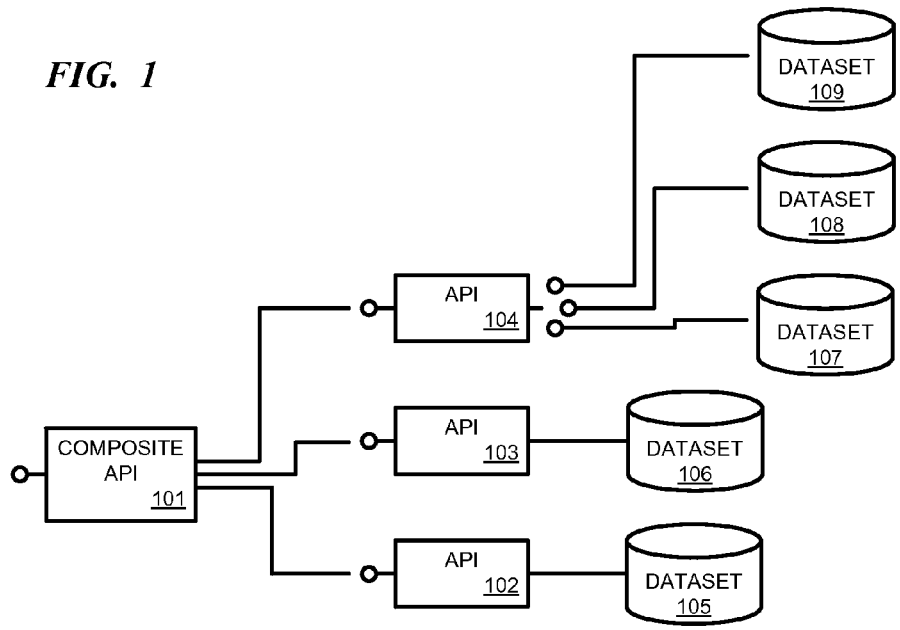
FIG. 1 is a block diagram of a composite API that allows users to access a single API instead of three separate APIs.

FIG. 1 is a block diagram of a composite API 101 that allows users to access a single API instead of three separate APIs 102-104. For example, a user may be interested in data for three different subjects. Two of the subjects are available from single sources, such as datasets 105 and 106, but the third subject may be available from multiple sources, such as datasets 107-109. API 102 provides access to dataset 102, and API 103 provides access to dataset 103. API 104 provides access to any or all of datasets 107-109. The user may need to access just one of these datasets to obtain the desired information. For example, datasets 107-109 may be mapping data that is available from different vendors and/or that is relevant to different geographical areas. The user may select which of the datasets 107-109 to use, for example, based upon a subscription price or a location of interest.

Typically, the user would have to query each dataset individually to obtain the desired information (i.e. query datasets 105 and 106 and one of datasets 107-109) using the appropriate API 102-104. The user would then process the desired information after querying and receiving responses from each dataset. However, using composite API 101, the user only needs to query one API in order to access all three datasets. The composite API 101 is constructed so that it parses the user's query and generates relevant queries to the selected datasets.

In one embodiment, a user may purchase or subscribe to composite API 101. The user identifies the appropriate datasets to the API to use in responding to queries. For example, if the user is subscribed to datasets 105, 106 and 109, then he or she would identify those datasets to API 101. The user does not need to access APIs 102-104 to query the designated datasets because API 101 generates the relevant queries to those dataset-specific APIs. API 101 collects the responses from the dataset-specific APIs and, after further processing, provides an output to the user.

For example, a user who is knowledgeable about fishing, but does not have the skill or time to create and maintain the relevant databases may generate a composite API 101 that identifies optimal times for fishing at different locations. The user may know how to combine location, weather, and fish information to identify optimal fishing conditions. Instead of individually querying a location dataset 105, a fish database, and a weather dataset 109, the user instead provides a single query to API 101 which in turn generates the relevant queries to datasets 105, 106 and 109 and returns an answer to the user based upon the data obtained from the datasets. In this example, datasets 107-109 may be different weather datasets. Dataset 109 may be selected over the other choices because, for example, the user already has a subscription the dataset, the dataset is free, the other datasets are less accurate or are for the wrong location, etc. In other embodiments, two or more or all of datasets 107-109 may be available to API 101, which selects which dataset to query or which queries all available datasets.

Once the user has created API 101, he or she may offer API 101 to other users via a website, an on-line data market, or other source either for free or for a fee. New users may then access API 101 to identify optimal fishing conditions using any combination of datasets 105-109 that are selected by the new user. For example, API 101 may always require datasets 105 and 106, but new users may select any dataset 107-109 to use with the composite API. In one embodiment, the API creator and/or data market does not have to provide dataset access, but simply offers the composite API to new users or purchasers.

Figure 2:
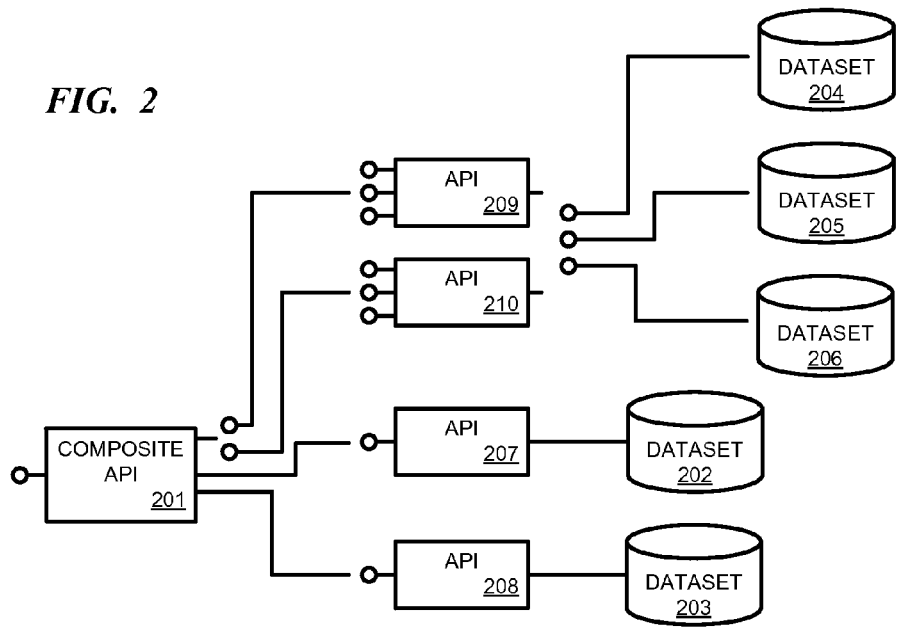
FIG. 2 is a block diagram of a composite API that allows users to access multiple APIs according to another embodiment.

FIG. 2 is a block diagram of a composite API 201 that allows users to access multiple APIs according to another embodiment. API 201 allows users to access datasets 203 and 205 and one or more of datasets 204-206 using a single query. API 207 is used to access dataset 202, and API 208 is used to access dataset 203. Datasets 204-206 may be accessed using either API 209 or API 210. Composite API 201 may use either API 209 or 210 depending, for example, a user selection or other criteria. One of APIs 209 or 210 might be better suited depending upon the selected dataset 204-206 and, therefore, APIs 201 may select which API to use depending upon the available or selected datasets 204-206.

Alternatively, APIs 209 and 210 may accept multiple inputs. As illustrated in FIG. 2, APIs 209 and 210 each receive three different input types. For example, if these APIs are associated with weather datasets 204-206, then the inputs may be a location, a time, and a date. The composite API 201 may provide any of these input types to selected API 209 or 210 depending upon the input provided by the user.

Figure 3:
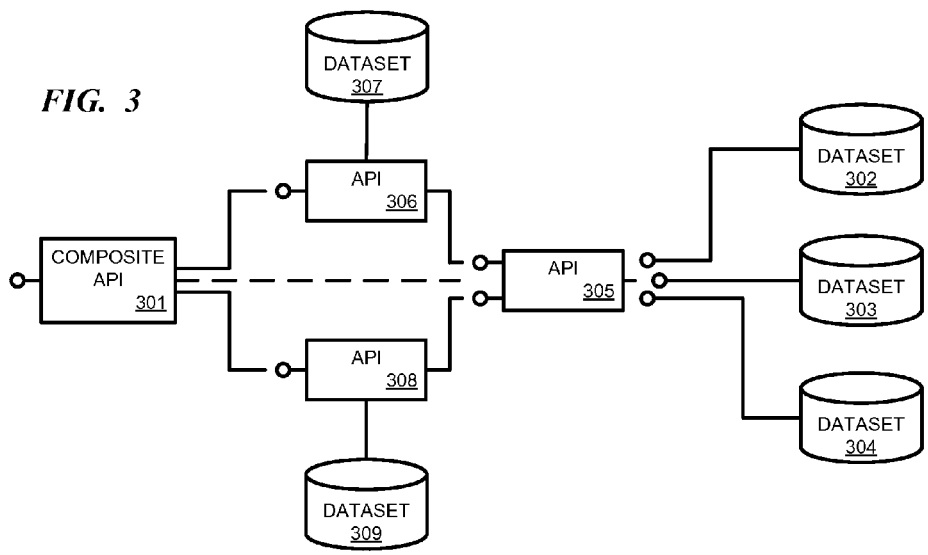
FIG. 3 is a block diagram of a composite API that incorporates multiple levels of embedded APIs.

FIG. 3 is a block diagram of a composite API 301 that incorporates multiple levels of embedded APIs. Composite API 301 provides access to one or more selected datasets 302-304 through API 305. A user may select which datasets 302-304 should be used with composite API 301. The datasets may be selected based upon their relative cost, availability, coverage, or usability. In one embodiment, API 301 may convert or modify user queries into a format useable by API 305. For example, if API 305 requires a unique or specialized query format, API 301 may expose a simple input format to the user and then convert the user inputs to a format (dashed line) used by API 305.

In another embodiment, the query format used by API 305 may require addition processing of the data produced by API 301. API 306 may be used to convert an output from API 301 to a format required by API 305. Alternatively, API 306 may query dataset 307 to get information needed to query API 305. API 306 uses data from dataset 307 to make the conversion. API 308 and dataset 309 may also be used to convert data from API 301 to a format useful to API 305 in parallel with API 306 or instead of API 306.

This would give the user additional flexibility so that API 301 can select either API 306 or API 308 to generate the proper query for API 305 based upon the information provided by the user to API 301. For example, API 305 may require queries to include a zip code. In one scenario, API 306 may be used to generate the necessary zip code if the user inputs a city identifier to API 301. In another scenario, API 308 may be used to generate the latitude/longitude if the user inputs latitude/longitude coordinates to API 301. This allows API 301 to expose the data in selected datasets 302-304 in response to queries using a variety of formats.

In other embodiments, APIs 306 and/or 308 may also be composite APIs so that users can embed multiple levels of APIs and composite APIs within other composite APIs.

Figure 4:
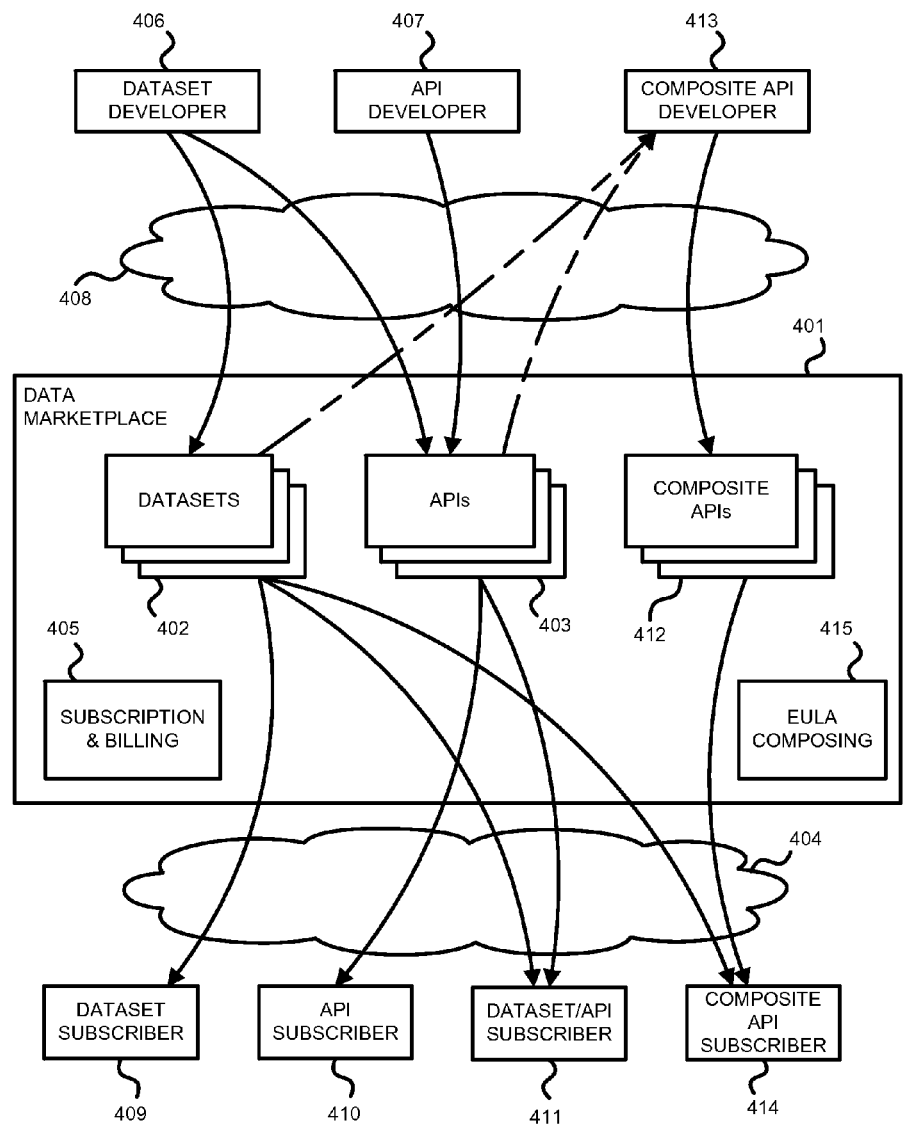
FIG. 4 is a block diagram illustrating a data marketplace that offers datasets and APIs to users according to one embodiment.

FIG. 4 is a block diagram illustrating a data marketplace 401 that offers datasets and APIs to users according to one embodiment. Marketplace 401 comprises a plurality of datasets 402 and APIs 403 that are available for use by subscribers. Marketplace 401 may be a website hosted on a web server that is accessed by subscribers via a public or private network 404, such as an intranet or Internet. The subscribers may browse the available datasets 402 and APIs 403 listed on data marketplace 401. When a subscriber identifies useful or required content in marketplace 401, subscription and billing module 405 allows the subscriber to purchase a subscription to the selected content.

The data marketplace content, such as datasets 402 and APIs 403, is provided by dataset developers 406 and/or API developers 407. The content may be uploaded to marketplace 401 by dataset developers 406 and/or API developers 407 via a public or private network 408, such as an intranet or Internet. In one embodiment, some or all of the publishers and developers are independent from and unrelated to the operator of marketplace 401 and the subscribers. Marketplace 401 provides a centralized location for the dataset developers 406 and API developers 407 to offer their content to potential subscribers.

Datasets developer 406 collects, correlates, and organizes information on selected topics, industries, locations and/or events. The data dataset developer 406 then makes the processed information available as a dataset 402 on data marketplace 401. Datasets 402 may use a standardized protocol for querying data, such as the Open Data Protocol (OData). A dataset subscriber 409 may have an interest in or need for the information available in dataset developer 406's dataset 402. Data marketplace 401 allows a subscriber 409 to review many datasets from a number of different data developers 406 without having to identify and seek out each dataset developer separately. Once subscriber 409 selects a dataset 402, subscription and billing module 405 allows the subscriber to enter into a contract for access to the dataset. Subscription and billing module 405 also handles billing to the dataset subscriber 409 and payment to dataset developer 406.

APIs 403 allow subscribers to access datasets 402. APIs 403 may be created by a dataset developer along with an associated dataset 402. Alternatively, an API developer 407 may create an API 403 that works with someone else's dataset. The API developer 407 may then make the API available on data marketplace 401. An API subscriber 410 may have a need for the capabilities of API 403 to access a particular dataset. Data marketplace 401 allows the API subscriber 410 to review APIs 403 from different API developers 407 without having to identify and seek out each API developer 407 separately. Once API subscriber 410 selects an API 403, subscription and billing module 405 allows the subscriber to enter into a contract for access to the API. Subscription and billing module 405 also handles billing to the subscriber and payment to the API developer 407.

In one embodiment, one or more datasets 402 and APIs 403 are designed to operate in a cloud environment in which hosted services are delivered over the Internet. APIs 403 may be sold on a flat-fee or an on-demand basis. APIs 403 may also be elastic so that the user can have as much or as little of a service as required at any given time. Additionally, APIs 403 may be fully managed by the developer so that the subscriber needs nothing but a computer and Internet access.

Some APIs 403 may be adapted to operate on external datasets that are not available via data marketplace 401. A subscriber to an API 403 that requires an external dataset must provide access to the dataset used by the API. For example, an API to a mapping or geocoding dataset may require the subscriber to provide a link or access to such a dataset. Some API subscribers 410 will have access to the relevant data, such as from proprietary or other databases, and, therefore, only need subscribe to API 03 alone. Other subscribers 411, however, may also need to subscribe to one or more datasets 402 to be used by API 403. This would allow dataset and API subscriber 411 to use API 403, without having to provide or maintain the required data.

Data marketplace 401 may also offer composite APIs 412 that include a previously associated group of APIs 403. Composite APIs 412 may use datasets 402 or external datasets. A composite API developer 413 may identify an API 403 and one or more datasets 402 that can be used together. Composite API developer 413 creates a composite API 412 that combines the selected APIs. The composite APIs 412 may be associated with one or more datasets 402.

Each dataset 402 and API 403 in data marketplace 401 may be associated with a subscription fee. For example, a subscriber may be required to pay a fixed monthly fee to access a selected API or dataset. Alternatively, or in addition to the fixed monthly fee, the subscriber may pay a subscription fee that is based upon the volume of user, such as a fee based upon the number of queries to a dataset or based upon the number of records processed by the API. In one embodiment, subscription and billing module 405 determines the type of fee structure associated with a selected dataset or API and changes the subscriber accordingly. This type of billing is appropriate for subscribers 409-411, who have identified specific APIs 403 and/or datasets 402 on data marketplace 401 that they want to access. Subscription and billing module 405 may bill these subscribers directly or indirectly for the use of the selected APIs 403 and datasets 402.

However, this subscription and billing methodology may not be ideal for other subscribers, such as composite API subscriber 414, who wants to use composite API 412. Subscriber 414 would desire a single subscription, instead of several separate subscriptions to the underlying APIs and to the datasets that are part of composite API 412. For example, if one API 403 in composite API 412 has a flat fee monthly subscription and a second API 403 the composite API 412 has a per-query subscription, then composite API 414 would have to track different subscriptions to use one composite API 412.

In some embodiments, subscription and billing module 405 combines individual subscriptions for the underlying datasets 402 and APIs 403 that are used in composite APIs 412 and presents subscriber 414 with a single invoice for the package. In this way, the composite API developer 413 and composite subscriber 414 do not have to deal with multiple subscriptions, which may each have different terms and rates.

In one embodiment, each dataset 402 and API 403 indicates whether it may be combined with other content to create a composite API 412. The datasets 402 and APIs 403 may also designate one or more acceptable subscription plans that can be used in such a combination. The composite API developer 413 or the subscription and billing module 405 use these designated subscription plans to generate a composite subscription for the composite API 412.

A dataset 402 or API 403 indicates that it may be combined with other content into a composite package and designates one or more pricing models to be used. For example, the API may designate one or more of the following subscription plans that may be used in pricing the composite package:

- a fixed subscription fee that designates a set amount to be charged per month or other interval (e.g. $5.00 per month);
- a per-use subscription fee that designates a set amount to be charged per use, calculation, or query (e.g. $0.01 per query); and
- a revenue sharing subscription that designates a portion of the total composite package subscription fee to be paid to the API or dataset owner (e.g. 20% of the composite package subscription fee).

It will be understood that other pricing and billing models may also be used to determine the subscription rates of the composite API 412.

Subscription and billing module 405 determines the appropriate billing model to be used for a composite API 412 and bills subscriber 414 a single fee for the subscription. Subscription and billing module 405 then pays publishers and developers of the underlying datasets and APIs as required under the billing model.

The datasets 402 and APIs 403 may each have an associated end user license agreement (EULA) that defines the terms of use for subscribers. Data subscriber 409, API subscriber 410, and dataset/API subscriber 411 accept the terms of the EULA for the individual datasets 402 or APIs 403 to which they subscribe. Dataset/API subscriber 411 is subscribed to multiple items and accepts the EULAs associated with each selected dataset or API. However, a subscriber 414 to composite API 412 has not selected the underlying APIs and datasets and, therefore, does not expect to be presented with multiple EULAs to use the composite package 412.

In some embodiments, EULA composing module 415 provides a composite EULA for a composite API 412. In addition to designating pricing models for composite packages, APIs 403 may also designate EULA provisions that are desired or required for a composite API. When a composite API developer 413 creates a composite API 412, EULA composing module 415 identifies the EULA provisions required by the underlying APIs and datasets and combines those provisions into a single composite EULA that covers the composite API 412. Subscribers 414 are presented with this single composite EULA for acceptance when subscribing to the composite API 412.

EULA composing module 415 may use a set of rules to combine the EULA provisions from the combined datasets and APIs. The rules may provide guidance on how to handle conflicting EULA provisions. The rules may assist the EULA composing module 415 in determining which provisions to include in the composite EULA, such as the most restrictive or least restrictive of the conflicting provisions. The composite EULA may be automatically generated by EULA composing module 415 and provided to interested subscribers 414. In other embodiments, API developer 407 may review proposed composite EULAs prior to release of a composite API. The API developer may approve or propose modifications to the composite EULA prior to release to interested composite API 414.

Composite APIs 412 allow subscribers 414 to access multiple datasets at one time using a single query. A composite API subscriber 414 may only need a composite API 412 from marketplace 401 if the subscriber already has access to the datasets required by the composite API 412. For example, data marketplace 401 may provide a list of required and/or optional datasets to be used with the composite APIs. The user may configure the composite API 412 to point to the relevant datasets before use.

The composite APIs allow developers with knowledge of certain domains, datasets or scenarios to combine those that information into new uses. The composite APIs make it easier to expose the answer to a particular scenario and to consume the information available in multiple datasets. Composite APIs 412 expose rich, combined datasets that would otherwise be too difficult to use. Composite APIs 412 allow developers to optimize the individual datasets for user by subscribers without requiring the developer or subscriber to manage the underlying dataset.

Data marketplace 401 may be configured to recommend additional APIs and/or datasets to a composite API developer. For example, the marketplace may learn which APIs 403 are related to certain datasets. When a composite API developer 413 uses a particular type of dataset, the marketplace may recommend APIs for related datasets for the composite API developer to consider.

Figure 5:
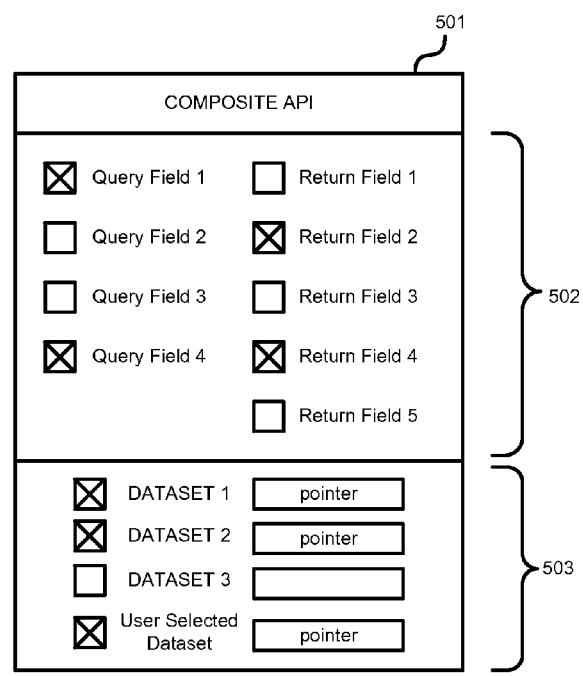
FIG. 5 illustrates configuration data that a developer and/or user may select for a composite API according to one embodiment.

FIG. 5 illustrates configuration data 501 that a developer and/or user may select for a composite API according to one embodiment. The developer and/or user may select one or more query fields in section 502. These query fields are supported by the composite application. The query fields may be unique to the composite API or may correspond to query fields supported by APIs that are embedded in the composite API. Depending upon the composite API configuration, the selected query fields may be required in queries from the user. Alternatively, the user may use one or more of the selected query fields. Generally, the composite API does not respond to the unselected query fields.

The developer and/or user may also select one or more return fields in section 502. These return fields are supported by the composite application. The return fields may be unique to the composite API or may correspond to return fields supported by APIs that are embedded in the composite API. Generally, the composite API will return all of the selected return fields. In other embodiments, the return fields may be optional and/or alternative, and the composite API may return any of the selected return fields that correspond to data available in selected datasets.

Section 503 allows the developer and/or user to select the datasets to be used with the composite APIs. The selected datasets also include a pointer to the location of the dataset, which may be a local network folder address and/or an Internet address or uniform resource locator (URL), for example. The datasets may be pre-configured to have a developer-designated identity and/or address, such as a specific dataset that must be used by the composite API. Alternatively, one or more of the datasets may be user-selected datasets. The composite API may support multiple datasets for a particular feature. The user may select one or more datasets for that feature. The user-selected datasets may be on a pre-approved list or may meet certain pre-defined characteristics to function properly with the composite API. For example, the composite API associated with a weather application may require a specific geocoding dataset, but may allow the user to select a weather dataset from a list of compatible datasets. The user may already have a subscription or other access to one of the weather datasets, or may select an appropriate weather dataset for the user's location.

Figure 6:
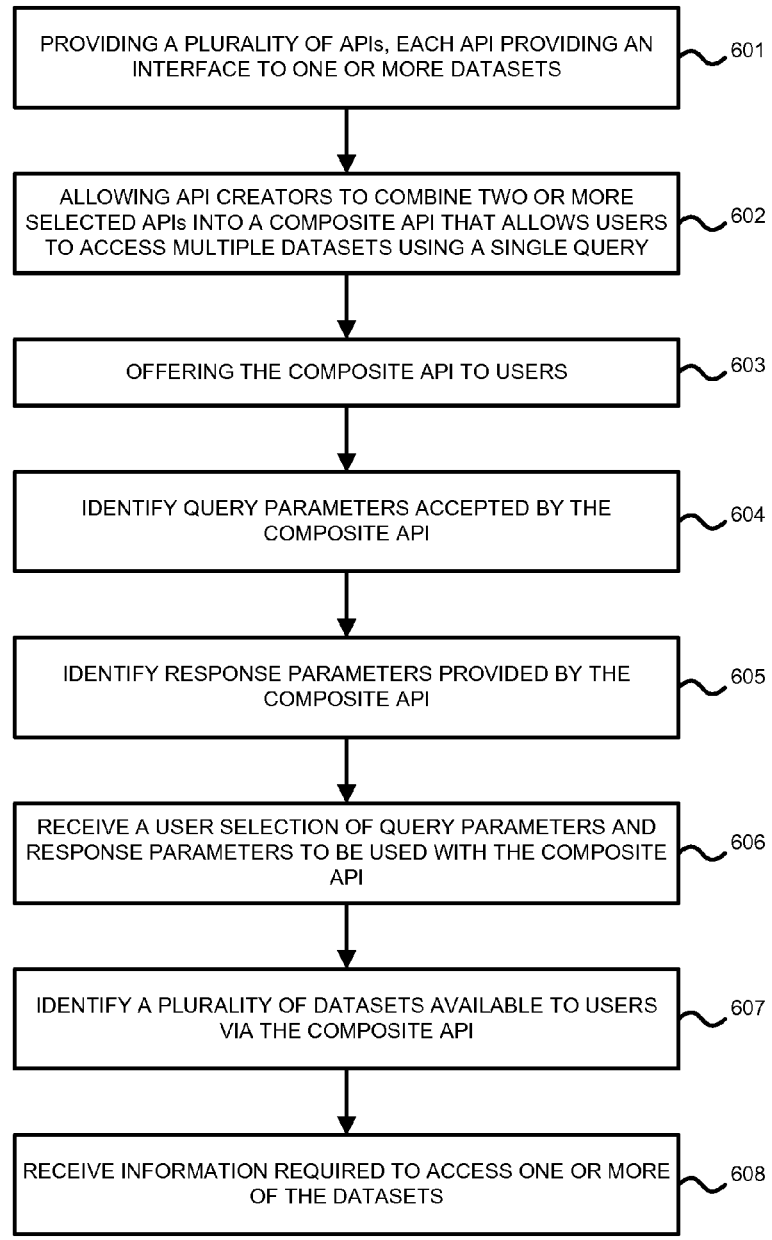
FIG. 6 is a flowchart illustrating a method or process for creating composite APIs to allow users to access multiple datasets.

FIG. 6 is a flowchart illustrating a method or process for creating composite APIs to allow users to access multiple datasets. In step 601, a plurality of APIs are provided. Each of the APIs provide an interface to one or more datasets. In step 602, API creators combine two or more selected APIs into a composite API that allows users to access multiple datasets using a single query. The composite API is offered to users in step 603. In one embodiment, the composite API may be offered to users via a website. In step 604, query parameters that are accepted by the composite API are identified. The query parameters may be, for example, fields or terms that accepted from users by the composite API. In step 605, response parameters that can be provided by the composite API are identified. The response parameters may be based, for example, on data collected from the datasets. In step 606, user selection of one or more query parameters and one or more response parameters to be used with the composite API.

In step 607, datasets that are available to users are identified. The datasets may represent datasets that can be accessed using the composite API or datasets that are required by the composite API to generate a desired response. In step 608, information that is required to access one or more of the datasets is received. The information may be, for example, a pointer, an address, a file name, or a URL that identifies where the dataset may be accessed.

Figure 7:
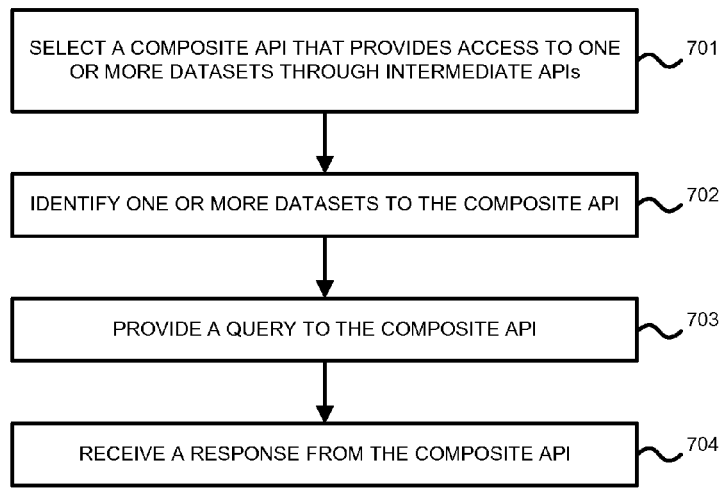
FIG. 7 is a flowchart illustrating a method or process for using a composite API according to one embodiment.

FIG. 7 is a flowchart illustrating a method or process for using a composite API according to one embodiment. The composite API may be used, for example, in a cloud computing environment where resources are distributed among different locations and/or machines. In step 701, a composite API that provides access to one or more datasets through intermediate APIs is selected. The intermediate APIs may be, for example, proprietary APIs that are associated with a particular dataset. In step 702, one or more datasets are identified to the composite API. The user may identify the datasets by designating a location for the datasets to the composite API. The datasets comprise optional datasets, and the user may be required to select at least one of the optional datasets for use with the composite API.

In step 703, the user provides a query to the composite API. In step 704, a response is received from the composite API. The response is generated using data collected from the one or more datasets via the intermediate APIs. In other embodiments, the composite API may support multiple query parameter, and the user may select one or more query parameters to be supported by the composite API. The composite API may also be capable of providing multiple response parameters, and the user may select one or more response parameters to be supported by the composite API.

It will be understood that steps 601-608 of the process illustrated in FIG. 6 and steps 701-704 of the process illustrated in FIG. 7 may be executed simultaneously and/or sequentially. It will be further understood that each step may be performed in any order and may be performed once or repetitiously.

Figure 8:
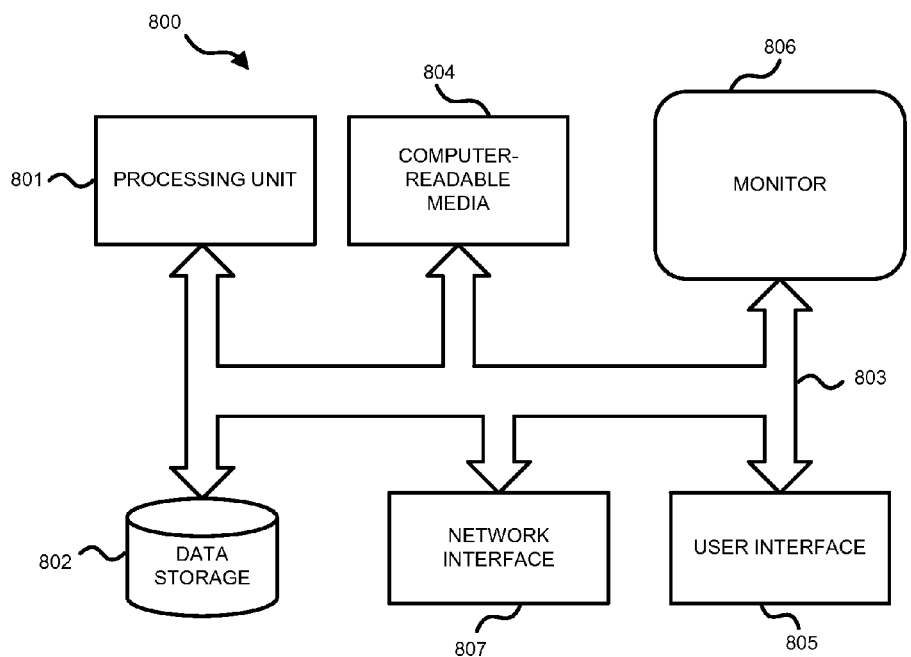
FIG. 8 illustrates an example of a suitable computing and networking environment for providing composite APIs to access datasets.

FIG. 8 illustrates an example of a suitable computing and networking environment 800 on which the examples of FIGS. 1-7 may be implemented to provide composite APIs for access datasets. The computing system environment 800 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the invention may include a general purpose computing device in the form of a computer 800. Components may include, but are not limited to, various hardware components, such as processing unit 801, data storage 802, such as a system memory, and system bus 803 that couples various system components including the data storage 802 to the processing unit 801. The system bus 803 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 800 typically includes a variety of computer-readable media 804. Computer-readable media 804 may be any available media that can be accessed by the computer 800 and includes both volatile and nonvolatile media, and removable and non-removable media, but excludes propagated signals. By way of example, and not limitation, computer-readable media 804 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium or computer-readable storage device which can be used to store the desired information and which can accessed by the computer 800. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 802 includes computer storage media in the form of volatile and/or nonvolatile memory such as read only memory (ROM) and random access memory (RAM). A basic input/output system (BIOS), containing the basic routines that help to transfer information between elements within computer 800, such as during start-up, is typically stored in ROM. RAM typically contains data and/or program modules that are immediately accessible to and/or presently being operated on by processing unit 801. By way of example, and not limitation, data storage 802 holds an operating system, application programs, and other program modules and program data.

Data storage 802 may also include other removable/non-removable, volatile/nonvolatile computer storage media. By way of example only, data storage 802 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 8, provide storage of computer-readable instructions, data structures, program modules and other data for the computer 800.

A user may enter commands and information through a user interface 805 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 801 through a user input interface 805 that is coupled to the system bus 803, but may be connected by other interface and bus structures, such as a parallel port, game port or a universal serial bus (USB). A monitor 806 or other type of display device is also connected to the system bus 803 via an interface, such as a video interface. The monitor 806 may also be integrated with a touch-screen panel or the like. Note that the monitor and/or touch screen panel can be physically coupled to a housing in which the computing device 800 is incorporated, such as in a tablet-type personal computer. In addition, computers such as the computing device 800 may also include other peripheral output devices such as speakers and printer, which may be connected through an output peripheral interface or the like.

The computer 800 may operate in a networked or cloud-computing environment using logical connections 807 to one or more remote devices, such as a remote computer. The remote computer may be a personal computer, a server, a router, a network PC, a peer device or other common network node, and typically includes many or all of the elements described above relative to the computer 800. The logical connections depicted in FIG. 8 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 800 may be connected to a public or private network through a network interface or adapter 807. In some embodiments, a modem or other means for establishing communications over the network. The modem, which may be internal or external, may be connected to the system bus 803 via the network interface 807 or other appropriate mechanism. A wireless networking component such as comprising an interface and antenna may be coupled through a suitable device such as an access point or peer computer to a network. In a networked environment, program modules depicted relative to the computer 800, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    providing a plurality of data source application programming interfaces (API) to API creators, each of the APIs providing an interface to one or more data sources;
    allowing the API creators to create a composite API that allows users to access multiple data source APIs using a single query, the composite API configured to generate intermediate queries to two or more intermediate APIs, wherein each intermediate API is configured to retrieve information from an associated data source based upon an intermediate query and to provide the information to the composite API, the composite API configured to return information from two or more data sources in response to the single query, wherein the response is in a format not available from any of the individual data sources; and
    offering the composite API to users.

2. The computer-implemented method of claim 1, further comprising:
    identifying query parameters accepted by the composite API; and
    identifying response parameters provided by the composite API.

3. The computer-implemented method of claim 2, further comprising:
    receiving a user selection of one or more query parameters and one or more response parameters to be used with the composite API.

4. The computer-implemented method of claim 1, further comprising:
    identifying, to the composite API, locations of one or more data sources required by the composite API.

5. The computer-implemented method of claim 1, further comprising:
    identifying one or more data sources that are available to users via the composite API.

6. The computer-implemented method of claim 1, further comprising:
    identifying one or more data sources that are required for use with the composite API.

7. The computer-implemented method of claim 1, further comprising:
    identifying a plurality of data sources that are available to users via the composite API; and
    receiving information required to access to one or more of the plurality of data sources.

8. The computer-implemented method of claim 1, wherein the selected APIs use a standardized protocol for querying data.

9. The computer-implemented method of claim 8, wherein the protocol is Open Data Protocol (OData).

10. The computer-implemented method of claim 1, further comprising:
    combining billing requirements for the selected APIs into a billing model for the composite API.

11. The computer-implemented method of claim 1, further comprising:
    identifying a group of end-user license terms for each of the selected APIs; and
    combining the end-user license terms for each of the selected APIs into a composite end-user license agreement (EULA) for the composite API.

12. The computer-implemented method of claim 1, further comprising:
    offering the composite API to users via a website.

13. The computer-implemented method of claim 1, further comprising:
    providing a data marketplace to users, the data marketplace offering a plurality of APIs; and
    allowing users to upload the composite API to the data marketplace to be offered to other users.

14. In a computing environment where resources are distributed, a method for accessing datasets on resources distributed in the computing environment, the method comprising:

selecting a composite application programming interface (API) executing on a processor that provides access to one or more datasets through a plurality of intermediate APIs;
identifying the one or more datasets to the composite API;
providing a query to the composite API; and
receiving a response from the composite API, the response generated using data collected from the one or more datasets via the plurality of intermediate APIs, wherein the composite API is configured to provide an output resulting from the query to an intermediate API, and wherein the intermediate API is configured to convert the output into a format required by at least one of the plurality of APIs.

15. The method of claim 14, further comprising:
selecting one or more query parameters to be supported by the composite API; and
selecting one or more response parameters to be supported by the composite API.

16. The method of claim 14, wherein the one or more datasets comprise optional datasets, and the method further comprising:
selecting at least one of the optional datasets for use with the composite API.

17. The method of claim 14, wherein the one or more datasets are identified using one or more of a pointer, an address, a file name, and a uniform resource locator (URL).

18. The computer-implemented method of claim 14, further comprising:
providing a virtual marketplace offering at least one composite API;
receiving a subscriber query to a selected composite API via the virtual marketplace; and
providing a response from the composite API to the subscriber via the virtual marketplace.

19. A computer-readable storage device storing computer-executable instructions that when executed by at least one processor cause the at least one processor to perform a method for accessing datasets, the method comprising:
providing a plurality of data source application programming interfaces (API) to users, each of the APIs providing an interface to one or more data sources; and
allowing API creators to create a composite API that allows users to access multiple data source APIs using a single query, the composite API configured to generate intermediate queries to two or more intermediate APIs, wherein each intermediate API is configured to retrieve information from an associated data source based upon an intermediate query and to provide the information to the composite API, the composite API configured to return information from two or more data sources in response to the single query, wherein the response is in a format not available from any of the individual datasets.

20. The computer-readable storage device of claim 19, further comprising:
receiving a user selection of a composite API; and
identifying, to the user-selected composite API, locations of one or more data sources to be accessed by the composite API.

21. The computer-readable storage device of claim 19, further comprising:

combining billing requirements for the selected APIs into a billing model for the composite API.

22. The computer-readable storage device of claim 19, further comprising:
identifying a group of end-user license terms for each of the selected APIs; and
combining the end-user license terms for each of the selected APIs into a composite end-user license agreement (EULA) for the composite API.

23. The computer-readable storage medium of claim 19, further comprising:
allowing users to upload the composite API to a data marketplace to be offered to other users.

24. A dataset access system, comprising:
a processor; and
a memory coupled to the processor, the memory configured to store program instructions executable by the processor to cause the dataset access system to:
select a composite application programming interface (API) that provides access to one or more datasets through a plurality of APIs;
identify the one or more datasets to the composite API;
provide a query to the composite API; and
receive a response from the composite API, the response generated using data collected from the one or more datasets via the plurality of APIs, wherein the composite API is configured to provide an output resulting from the query to a first intermediate API and to a second intermediate API, wherein the first intermediate API is configured to convert the output into a format required by a first of the plurality of APIs by querying a first data source to obtain information needed to query the first of the plurality of APIs, and wherein the second intermediate API is configured to convert the output into a format required by a second of the plurality of APIs by querying a second data source to obtain information needed to query the second of the plurality of APIs.

25. The dataset access system of claim 24, the program instructions further cause the dataset access system to:
identify one or more query parameters to be supported by the composite API; and
identify one or more response parameters to be supported by the composite API.

26. The dataset access system of claim 24, the program instructions further cause the dataset access system to:
select at least one optional datasets for use with the composite API.

27. The dataset access system of claim 24, wherein the one or more datasets are identified using one or more of a pointer, an address, a file name, and a uniform resource locator (URL).

28. The dataset access system of claim 24, the program instructions further cause the dataset access system to:
provide a virtual marketplace offering at least one composite API;
receive a subscriber query to a selected composite API via the virtual marketplace; and
provide a response from the composite API to the subscriber via the virtual marketplace.

* * * * *